United States Patent
Lee et al.

(10) Patent No.: US 11,476,522 B2
(45) Date of Patent: Oct. 18, 2022

(54) METAL-AIR BATTERY

(71) Applicant: Samsung Electronics Co., Ltd., Suwon-si (KR)

(72) Inventors: Heungchan Lee, Seongnam-si (KR); Dongmin Im, Seoul (KR); Hwiyeol Park, Hwaseong-si (KR); Hyunchul Lee, Hwaseong-si (KR); Huisu Jeong, Seongnam-si (KR); Junhyeong Lee, Seoul (KR); Jin S. Heo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 623 days.

(21) Appl. No.: 16/154,944

(22) Filed: Oct. 9, 2018

(65) Prior Publication Data
US 2019/0148803 A1     May 16, 2019

(30) Foreign Application Priority Data

Nov. 15, 2017   (KR) .................. 10-2017-0152502
May 16, 2018   (KR) .................. 10-2018-0056169

(51) Int. Cl.
*H01M 12/08* (2006.01)
*H01M 4/86* (2006.01)
*H01M 4/90* (2006.01)

(52) U.S. Cl.
CPC ......... *H01M 12/08* (2013.01); *H01M 4/8605* (2013.01); *H01M 4/9016* (2013.01); *H01M 2004/8689* (2013.01)

(58) Field of Classification Search
CPC .. H01M 12/08; H01M 4/8605; H01M 4/9016; H01M 2004/8689
See application file for complete search history.

(56) References Cited

U.S. PATENT DOCUMENTS

| | | | |
|---|---|---|---|
| 7,282,295 B2 | 10/2007 | Visco et al. | |
| 7,479,242 B2 | 1/2009 | Takamura et al. | |
| 7,691,536 B2 | 4/2010 | Johnson | |
| 7,767,345 B2 | 8/2010 | Imagawa et al. | |

(Continued)

FOREIGN PATENT DOCUMENTS

| JP | 200987944 A | 4/2009 |
|---|---|---|
| JP | 2012094415 A | 5/2012 |

(Continued)

OTHER PUBLICATIONS

Park, M. et al "A review of conduction phenomena in Li-ion batteries", vol. 195, pp. 7904-7929, published Jun. 25, 2010. (Year: 2010).*

(Continued)

*Primary Examiner* — Stewart A Fraser
*Assistant Examiner* — Lilia Nedialkova
(74) *Attorney, Agent, or Firm* — Cantor Colburn LLP

(57) ABSTRACT

A metal metal-air battery includes: an anode layer including a metal, a cathode layer spaced apart from the anode layer and including a hybrid conductive material having both electron conductivity and ionic conductivity; and a separator disposed between the anode layer and the cathode layer, wherein the hybrid conductive material includes a channel for metal ion transfer from the anode layer and a channel for electron transfer between the cathode and the anode.

26 Claims, 13 Drawing Sheets

(56) References Cited

U.S. PATENT DOCUMENTS

| | | |
|---|---|---|
| 8,932,771 B2 | 1/2015 | Visco et al. |
| 2007/0231704 A1 | 10/2007 | Inda |
| 2008/0070087 A1 | 3/2008 | Johnson |
| 2011/0059355 A1 | 3/2011 | Zhang et al. |
| 2011/0091777 A1* | 4/2011 | Mizuno ................ H01M 4/525 |
| | | 429/403 |
| 2011/0129739 A1 | 6/2011 | Nakanishi |
| 2011/0223494 A1 | 9/2011 | Feaver et al. |
| 2012/0077084 A1 | 3/2012 | Christensen et al. |
| 2012/0077095 A1 | 3/2012 | Roumi et al. |
| 2013/0078535 A1* | 3/2013 | Aizawa ............... H01M 4/9016 |
| | | 429/403 |
| 2013/0089795 A1* | 4/2013 | Chase ................ H01M 4/0471 |
| | | 429/405 |
| 2013/0143132 A1 | 6/2013 | Mizuno |
| 2013/0316253 A1 | 11/2013 | Barde et al. |
| 2014/0205917 A1* | 7/2014 | Mizuno ................ H01M 12/08 |
| | | 429/405 |
| 2018/0123116 A1 | 5/2018 | Lee et al. |

FOREIGN PATENT DOCUMENTS

| | | |
|---|---|---|
| KR | 1020130015089 A | 2/2013 |
| KR | 1020170060674 A | 6/2017 |
| WO | 2015053496 A1 | 4/2015 |

OTHER PUBLICATIONS

Extended European Search Report for European Patent Application No. 18203376.1 dated Feb. 26, 2019.

\* cited by examiner

<COMPARATIVE EXAMPLE>

<COMPARATIVE EXAMPLE>

<COMPARATIVE EXAMPLE>

1 ~ 10 cycles

101 ~ 110 cycles

201 ~ 210 cycles

METAL-AIR BATTERY

CROSS-REFERENCE TO RELATED APPLICATION

This application claims priority to and the benefit of Korean Patent Application No. 10-2017-0152502, filed on Nov. 15, 2017, and Korean Patent Application No. 10-2018-0056169, filed on May 16, 2018, in the Korean Intellectual Property Office, and all the benefits accruing therefrom under 35 U.S.C. § 119, the contents of which in their entirety are incorporated herein by reference.

BACKGROUND

1. Field

The present disclosure relates to a secondary battery, and more particularly, to a metal-air battery.

2. Description of the Related Art

A metal-air battery includes an anode that adsorbs and emits ions and a cathode that uses oxygen present in the air as an active material. A reduction/oxidation reaction of oxygen, which is introduced from outside of the battery, e.g., from air, occurs at the cathode, and an oxidation/reduction reaction of a metal occurs at the anode. The metal-air battery converts chemical energy generated by the oxidation/reduction reaction into electrical energy and outputs the electrical energy. For example, the metal-air battery absorbs oxygen during discharge and emits oxygen during charge. Since the metal-air battery uses oxygen from the air, an energy density of the metal-air battery may be significantly improved. For example, the metal-air battery may have an energy density that is several times greater than an energy density of a lithium ion battery.

A capacity or performance of the metal-air battery may be influenced, for example, by a material and a configuration of a cathode (air electrode). In addition, chemical deterioration and deformation of the metal-air battery, caused by the generation of a reaction product during charge/discharge, may cause a reduction in battery performance and lifespan. Thus there remains a need for an improved battery material, and a battery including the same.

SUMMARY

Provided is a metal-air battery having excellent performance.

Provided is a metal-air battery capable of preventing chemical deterioration and deformation, e.g., chemical deterioration and deformation caused by charging/discharging.

Provided is a metal-air battery having improved charge/discharge characteristics.

Provided is a metal-air battery capable of preventing problems caused by an organic electrolyte.

Provided is a metal-air battery capable of facilitating processes and reducing manufacturing costs.

Additional aspects will be set forth in part in the description which follows and, in part, will be apparent from the description, or may be learned by practice of the presented embodiments.

According to an aspect of an embodiment, a metal-air battery includes: an anode layer including a metal; a cathode layer spaced apart from the anode layer and including a hybrid conductive material having both electron conductivity and ion conductivity; and a separator disposed between the anode layer and the cathode layer, wherein a ratio of cation conductivity to electron conductivity of the hybrid conductive material is in a range of about 0.01 to about 100.

A ratio (A/B) of cation conductivity (A) to electron conductivity (B) of the hybrid conductive material may be in a range of about 0.01 to about 100.

The ratio (A/B) of the cation conductivity (A) to the electron conductivity (B) of the hybrid conductive material may be in a range of about 1 to about 10.

The hybrid conductive material may include a lithium-based oxide, a sodium-based oxide, or a combination thereof.

The hybrid conductive material may include a lithium manganese oxide (LMO), lithium cobalt oxide (LCO), lithium manganese nickel oxide (LMNO), lithium nickel manganese cobalt oxide (NMC), lithium nickel oxide (LNO), lithium iron phosphate (LFP), lithium iron manganese phosphate (LFMP), or a combination thereof.

The hybrid conductive material may include an inorganic material having a perovskite structure, an anti-perovskite structure, a layered structure, a spinel structure, or a NASICON-type structure.

The hybrid conductive material may be an inorganic material-based solid compound.

The cathode portion may be an organic-electrolyte-free electrode not including an organic electrolyte.

The cathode portion may include empty spaces in which a reaction product generated through the electrochemical reaction is provided, and the empty spaces may be electrolyte-free regions.

The cathode portion may include a pore-containing layer containing pores, and the pore-containing layer may include the hybrid conductive material.

The pore-containing layer may have porosity of about 90 vol % or less.

The pore-containing layer may have a specific surface area of about 100 $m^2/g$ or more.

The pore-containing layer may have a lamella structure.

The cathode portion may include a cathode layer including the hybrid conductive material, and the cathode layer may be a non-carbon-based material layer.

The cathode portion may include a cathode layer including the hybrid conductive material and further include a gas diffusion layer disposed on at least one surface of the cathode layer.

The separator may include a solid electrolyte.

The metal-air battery may be a liquid-electrolyte-free battery not including a liquid electrolyte.

The metal-air battery may be an organic-electrolyte-free battery not including an organic electrolyte.

According to an aspect of another embodiment, a metal-air battery includes: a cathode layer including a hybrid conductive material having both of ion conductivity and electron conductivity; an anode layer including a metal; and a separator between the anode layer and the cathode layer and including a solid electrolyte.

The hybrid conductive material may be an inorganic material-based solid compound including a metal element, and the cathode portion may be an organic-electrolyte-free electrode not including an organic electrolyte.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
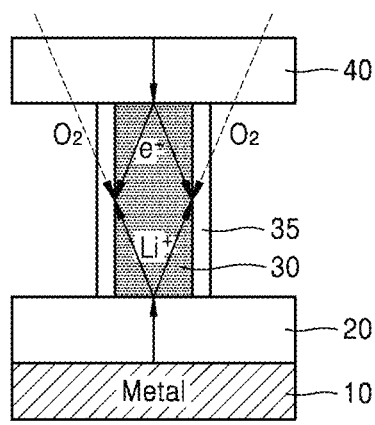
FIG. 1 is a schematic cross-sectional view of an embodiment of a metal-air battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

Various example embodiments will now be described more fully with reference to the accompanying drawings in which example embodiments are shown.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. It will be understood that when an element is referred to as being "on" another element, it can be directly on the other element or intervening elements may be present therebetween. In contrast, when an element is referred to as being "directly on" another element, there are no intervening elements present.

As used herein the term "and/or" includes any and all combinations of one or more of the associated listed items.

It will be understood that, although the terms "first", or "second," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Or" means "and/or."

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, a metal-air battery according to an embodiment will be described in further detail with reference to the accompanying drawings. Sizes or thicknesses of layers or regions shown in the accompanied drawings are somewhat exaggerated for clarity of the specification and convenience of description. Throughout the detailed description, like reference numerals denote like elements.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

FIG. 1 is a schematic cross-sectional view of an embodiment of a metal-air battery.

Referring to FIG. 1, the metal-air battery includes an anode layer 10 including a metal, and a cathode layer 30 spaced apart from the anode layer 10. The cathode layer 30 may include a hybrid conductive material capable of conducting both electrons and ions. In this regard, the hybrid conductive material may be referred to as a multi-conductive material, a mixed-conductive material, or a complex conductive material. The hybrid conductive material will be described in more detail later. A separator 20 may be disposed between the anode layer 10 and the cathode layer 30. The metal-air battery may further include a gas diffusion layer 40 contacting at least one surface of the cathode layer 30. The gas diffusion layer 40 may facilitate supply of oxygen ($O_2$) to the cathode layer 30. The cathode layer 30 may be referred to as a "cathode catalyst layer" or be simply referred to as a "cathode." The cathode layer 30 and the gas diffusion layer 40 may be considered to constitute a single "cathode portion." In an embodiment, the cathode portion of the metal-air battery may include the cathode layer 30 and optionally further include the gas diffusion layer 40.

The anode layer 10 may include a material capable of adsorbing and emitting metal ions. The aforementioned material may include, for example, lithium (Li), sodium (Na), zinc (Zn), potassium (K), calcium (Ca), magnesium (Mg), iron (Fe), aluminum (Al), an alloys thereof, or a combination thereof. For example, the anode layer 10 may include lithium (Li). In this case, the anode layer 10 may include lithium, a lithium-based alloy, a lithium intercalation compound, or a combination. When the anode layer 10 includes lithium, the metal-air battery according to the present embodiment may be referred to as a "lithium-air battery."

The cathode layer 30 may be an air electrode configured for using oxygen ($O_2$) from air as an active material. As described above, the cathode layer 30 may include a hybrid conductive material capable of conducting both electrons and ions. The hybrid conductive material may provide a channel for metal ion transfer and a channel for electron transfer such that metal ions supplied from the anode layer 10 and a gas (e.g., oxygen) supplied from the cathode layer 30 electrochemically react with each other. In other words, the hybrid conductive material may have both of a function as a cathode providing a channel for electron transfer and a function as an electrolyte providing a channel for ion transfer. The hybrid conductive material may be a solid inorganic compound. Therefore, the cathode layer 30 may be an electrode not including an organic electrolyte, that is, may be an organic-electrolyte-free electrode. In an embodiment, the hybrid conductive material consists of the solid inorganic compound. In addition, the cathode layer 30 may be an electrode not including a liquid electrolyte, that is, the cathode layer may be a liquid-electrolyte-free electrode.

When the metal-air battery according to the present embodiment is a lithium-air battery, the following electrochemical reaction may occur during discharge of the metal-air battery.

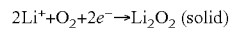

$$2Li^+ + O_2 + 2e^- \rightarrow Li_2O_2 \text{ (solid)}$$

Lithium ions ($Li^+$) supplied from the anode layer 10 and oxygen ($O_2$) supplied from air may combine (react) with electrons ($e^-$) on a surface of the cathode layer 30 to generate a solid, which, while not wanting to be bound by theory, is understood to comprise $Li_2O_2$. In this case, the hybrid conductive material of the cathode layer 30 may provide both of a channel (path) for a lithium ion ($Li^+$) transfer and a channel (path) for electron transfer. The generated product, e.g., $Li_2O_2$, is a reaction product 35. A discharging reaction may be reversely carried out during charge.

A ratio (A/B) of cation conductivity (A) to electron conductivity (B) of the hybrid conductive material of the cathode layer 30 may be in a range of about 0.01 to about 100, about 0.1 to about 50, or in a range of about 1 to about 10. The cation conductivity of the hybrid conductive material of the cathode layer 30 may be greater than or approximately the same as the electron conductivity thereof. Cation conductivity (e.g., cation diffusivity) and electron conductivity may be expressed in the same unit and may be compared to each other. When the cation conductivity is greater than the electron conductivity, or when the ratio (A/B) of the cation conductivity to the electron conductivity is in the range of about 0.01 to about 100, in particular, in the range of about 1 to about 10, the hybrid conductive material may effectively perform a function as a cathode (air electrode) material of a metal-air battery. In order that the cation conductivity is greater than the electron conductivity, or the ratio (A/B) of the cation conductivity to the electron conductivity is in the range of about 0.01 to about 100, or in the range of about 1 to about 10, it is possible to select a composition ratio or a dopant of the hybrid conductive material. Although materials may have the same overall composition, the materials may differ in cation conductivity and electron conductivity according to a composition ratio or a dopant content. The hybrid conductive material may have an electron conductivity of about $10^{-5}$ Siemens per centimeter or greater.

The hybrid conductive material may include, for example, a lithium-based oxide, a sodium-based oxide, or a combination thereof. Specifically, the hybrid conductive material may include lithium manganese oxide (LMO), lithium cobalt oxide (LCO), lithium manganese nickel oxide (LMNO), lithium nickel manganese cobalt oxide (NMC), lithium nickel oxide (LNO), lithium iron phosphate (LFP), lithium iron manganese phosphate (LFMP), or a combination thereof. As desired, cation conductivity and electron conductivity characteristics may be appropriately controlled by selecting a composition ratio and a dopant of the aforementioned oxides. However, the aforementioned specific materials are a mere example. The hybrid conductive material may include a variety of other materials. In addition, the hybrid conductive material may have a perovskite structure, an anti-perovskite structure, a layered structure, a spinel structure, or a NASICON-type structure (i.e., may be isostructural with the sodium super ion conductor $Na_{1+x}Zr_2Si_xP_{3-x}O_{12}$, wherein 0<x<3). The hybrid conductive material may be a solid inorganic compound including a metal element. In addition, the hybrid conductive material may be a non-carbon-based material.

The separator 20 may include an ion-conductive material between the anode layer 10 and the cathode layer 30 to conduct ions. The separator 20 may include a solid electrolyte. An electrolyte of the separator 20 may be in a solid phase and may comprise a polymer-based electrolyte, an inorganic-based electrolyte, a composite electrolyte, e.g., an electrolyte obtained by mixing the polymer-based electrolyte and the inorganic-based electrolyte, or a combination thereof. For example, the separator 20 may be a non-woven polymer fabric such as a non-woven fabric including a polypropylene material or a non-woven fabric including a polyphenylene sulfide material, or a porous film including an olefin-based resin such as polyethylene or polypropylene. However, specific materials of the solid electrolyte are a mere example, and any suitable solid material may be used.

The gas diffusion layer 40 may function to absorb oxygen from the air and supply the absorbed oxygen to the cathode layer 30. To this end, the gas diffusion layer 40 may have a porous structure to smoothly diffuse oxygen. For example, the gas diffusion layer 40 may comprise a carbon paper including a carbon fiber, carbon cloth, carbon felt, metal foam having a sponge-shape, or a metal fabric mat. In addition, the gas diffusion layer 40 may comprise a flexible porous material such as a non-woven fabric, e.g., a non-conductive non-woven fabric. However, the cathode layer 30 may comprise a porous structure or a structure similar to the porous structure so as to function as a gas diffusion layer. In this case, the gas diffusion layer 40 may be omitted.

Although not illustrated in FIG. 1, the metal-air battery may further include an anode current collector contacting the anode layer 10. The anode current collector may be disposed on a lower surface of the anode layer 10. Therefore, the anode layer 10 may be disposed between the anode current collector and the separator 20. The anode current collector may include any suitable conductor, for example, stainless steel (SUS). In addition, the metal-air battery may further include a cathode current collector contacting the gas diffusion layer 40. The cathode current collector may be disposed on an upper surface of the gas diffusion layer 40. Therefore, the gas diffusion layer 40 may be disposed between the cathode current collector and the cathode layer 30. The cathode current collector may comprise any suitable conductor, for example, stainless steel (SUS). In this case, the SUS of the cathode collector layer may have a mesh structure for transmitting air (gas). A material of the cathode current collector is not limited to the SUS. The material of the cathode current collector may be a combination of conductors. When the gas diffusion layer 40 is omitted (not used), the cathode current collector may contact the cathode layer 30. The anode current collector may be considered to be a part of an anode portion of the metal-air battery, and the cathode current collector may be considered to be a part of the cathode portion of the metal-air battery.

The metal-air battery may be a liquid-electrolyte-free battery, i.e., not including a liquid electrolyte. In addition, the metal-air battery may be an organic-electrolyte-free battery, i.e., not including an organic electrolyte. As described above, the metal-air battery may be the organic-electrolyte-free battery or the liquid-electrolyte-free battery. In this regard, the metal-air battery may have various features and functions. This will be described in further detail later.

Figure 2:
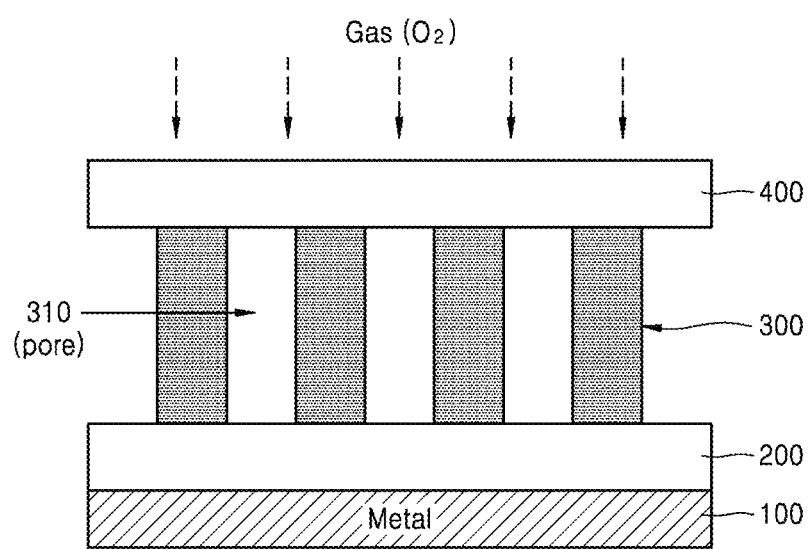
FIG. 2 is a cross-sectional view of another embodiment of a metal-air battery.

FIG. 2 is a cross-sectional view of a metal-air battery according to another embodiment.

Referring to FIG. 2, a cathode layer 300 may include a space 310 (e.g., a pore) in which a reaction product generated through an electrochemical reaction is disposed (located). Therefore, the cathode layer 300 may be referred to as a "pore-containing layer" including a space 310 (e.g., a pore or void). A plurality of pores may be approximately regularly or randomly arranged. In an embodiment, the plurality of pores may be electrolyte-free regions never including an electrolyte. In another embodiment, a portion of the pores may include an electrolyte. In an embodiment, since the cathode layer 300 includes a hybrid conductive material capable of conducting both electrons and ions, an electrolyte for conducting ions may be nonexistent around the cathode layer 300 and in the plurality of pores of the cathode layer 300, or may be provided in only some of the plurality of pores as desired. The plurality of pores of the cathode layer 300 may be spaces in which a reaction product is disposed, and concurrently, provide a channel for a gas (oxygen) transfer. When the plurality of pores are never filled with an electrolyte and remain empty or only some of the plurality of pores are filled with an electrolyte, improved gas (e.g., oxygen) transport may be provided.

Since a reaction area of the metal-air battery is increased as porosity, e.g., as a percentage of a cathode volume comprising a void of the cathode layer 300, is increased, a capacity and an energy density may be improved. The cathode layer 300 may have, for example, a porosity of about 90 volume percent (vol %) or less, based on a total volume of the cathode layer. The porosity may be in a range of 0 vol % to about 90 vol %, or in a range of about 30 vol % to about 90 vol %, or about 40 vol % to about 80 vol %, based on a total volume of the cathode layer 300. In addition, since the reaction area of the metal-air battery is increased as a specific surface area of the cathode layer 300 is increased, a capacity and an energy density may be improved. The cathode layer 300 may have a specific surface area of about 100 $m^2/g$ or more.

The remaining configurations except for the structure of the cathode layer 300 in FIG. 2 may be similar to the configurations described with reference to FIG. 1. That is, the metal-air battery may include an anode layer 100 and a separator 200 between the anode layer 100 and the cathode layer 300 and further include a gas diffusion layer 400 contacting the cathode layer 300. Materials and functions of the anode layer 100, the separator 200, and the gas diffusion layer 400 may be substantially the same as or similar to the materials and the functions of the anode layer 10, the separator 20, and the gas diffusion layer 40 described with reference to FIG. 1, respectively.

A pore-containing structure of the cathode layer 300 illustrated in FIG. 2 is a mere example. The pore-containing structure of the cathode layer 300 may be very variously modified. In an example, the pore-containing structure of the cathode layer 300 may be deformed as illustrated in FIG. 3.

Figure 3:
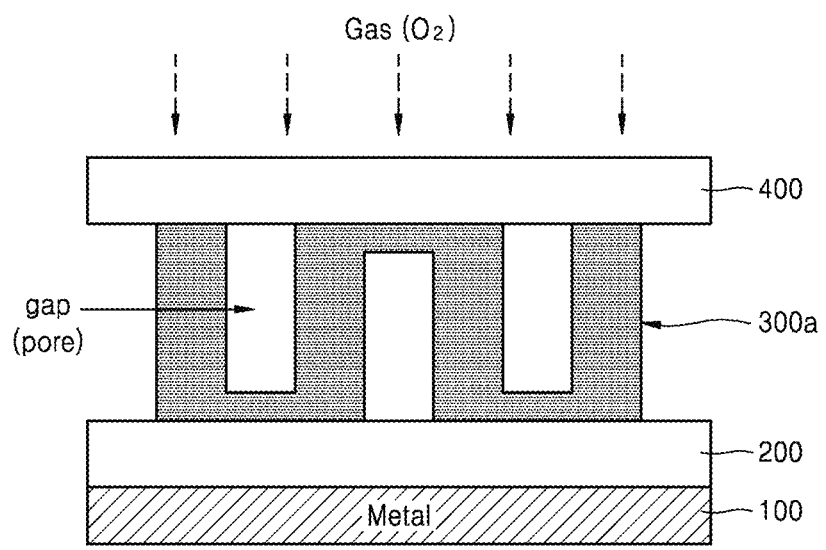
FIG. 3 is a cross-sectional view of another embodiment of a metal-air battery.

A cathode layer 300a of FIG. 3 may have a cross section having a zigzagged (meandering/winding) configuration in a selected direction. The cathode layer 300a may have a cross section zigzagged in a direction parallel to the separator 200 and the gas diffusion layer 400 therebetween. Therefore, the cathode layer 300a may have porosity and a specific surface area similar to those of the cathode layer 300 of FIG. 2 and may have a continuous or partially continuous lamella structure. The structures of the cathode layers 300 and 300a of FIGS. 2 and 3 may be an example of a lamella structure. The pore-containing structures of the cathode layers 300 and 300a may be schematically illustrated as an example in FIGS. 2 and 3. An actual cathode layer may include more pores and more complex structure than those illustrated in FIGS. 2 and 3.

The metal-air battery may include the cathode layers 30, 300, and 300a including the hybrid conductive material capable of conducting both electrons and ions. In this regard, the metal-air battery may fundamentally prevent chemical deterioration and an electrolyte squeeze-out, caused by an organic electrolyte. Therefore, it is possible to improve performance of a battery, increase a battery life, and reduce manufacturing processes and costs.

Figure 4:
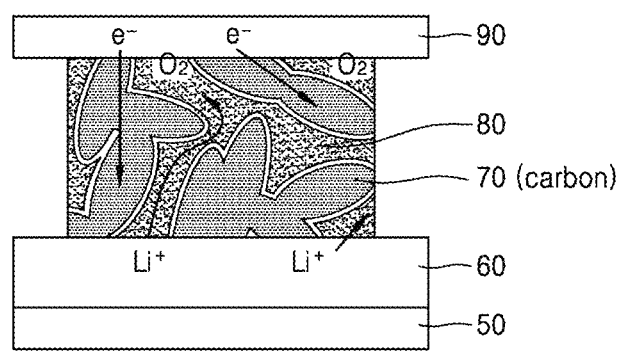
FIG. 4 is a cross-sectional view of a metal-air battery according to a Comparative Example.

FIG. 4 is a cross-sectional view of a metal-air battery according to a Comparative Example.

Referring to FIG. 4, a separator 60 may be disposed on an anode layer 50, and a porous cathode layer 70 including carbon may be disposed between the separator 60 and a gas diffusion layer 90. An electrolyte 80 may be impregnated in pores of the porous cathode layer 70. The electrolyte 80 may be an organic electrolyte and also be a liquid electrolyte. The porous cathode layer 70 may function as an electronic conductor, and the electrolyte 80 may function as an ionic conductor. That is, electrons (e⁻) may be transferred through the porous cathode layer 70, and lithium ions (Li⁺) may be transferred through the electrolyte 80. Oxygen and lithium ions may react with electrons to generate lithium oxide on a carbon surface of the porous cathode layer 70. The pores of the porous cathode layer 70 may provide spaces in which a reaction product, e.g., lithium oxide, is provided.

Since the reaction product, e.g., lithium oxide ($Li_2O_2$), has high reactivity and an intermediate product, that is, singlet oxygen ($O_2^-$) has very high reactivity, the lithium oxide and the singlet oxygen may chemically decompose the organic electrolyte 80 to rapidly deteriorate a battery. That is, chemical deterioration of a battery may be generated in a cathode portion by the reaction product, the intermediate product, and the organic electrolyte 80. The chemical deterioration may cause reduction in performance of a battery and a battery life.

However, since the hybrid conductive material conducting both electrons and ions is used as a cathode material of the metal-air battery and an organic electrolyte is not used in a cathode, or only a portion of the organic electrolyte is used therein, it is possible to fundamentally prevent or reduce chemical deterioration caused by the organic electrolyte. Therefore, it is possible to improve/maintain performance of a battery and increase a battery life. In addition, when a separate electrolyte is nonexistent in a cathode, manufacturing processes may be simplified, and manufacturing costs may be reduced, thereby efficiently developing a battery and improving a design of the battery.

Figure 5:
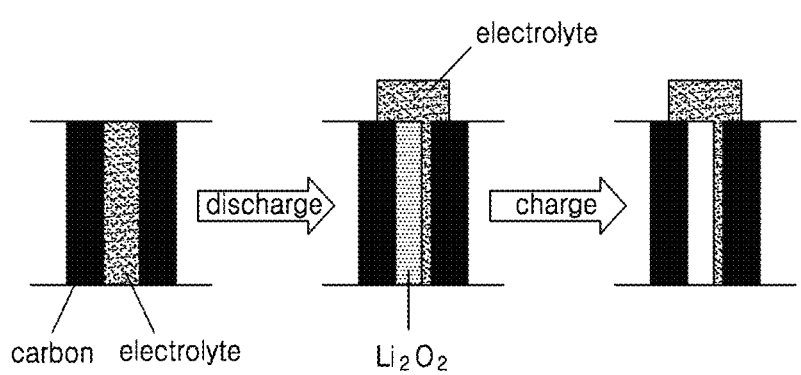
FIG. 5 is a diagram for describing an electrolyte squeeze-out of the metal-air battery according to the Comparative Example.

FIG. 5 is a diagram for describing an electrolyte squeeze-out of the metal-air battery according to the Comparative Example.

Referring to FIG. 5, when an electrolyte is provided in pores of a cathode layer including carbon and a reaction product (e.g., $Li_2O_2$) is generated in the pores during discharge (that is, a volume is increased), the electrolyte may be squeezed out from the pores. Although the reaction product (e.g., $Li_2O_2$) is removed through a charging process, a portion of the electrolyte squeezed out of the pores may not return to the pores. As a result, performance of a battery may be considerably reduced. In particular, the electrolyte squeeze-out may become more serious when a battery is fully discharged.

Figure 6:
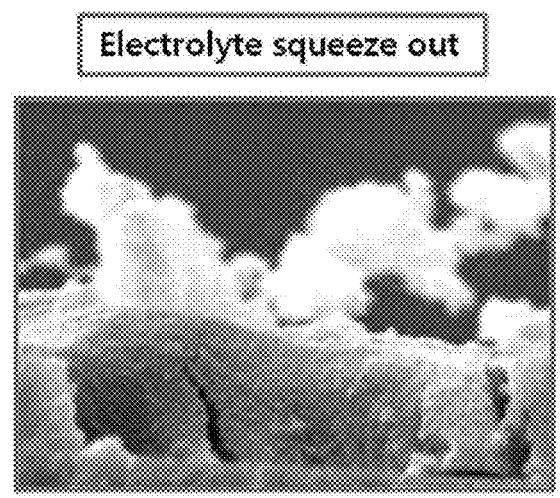
FIG. 6 is a scanning electron microscope (SEM) image showing a state in which an electrolyte is squeezed out from pores of a cathode layer in the metal-air battery according to the Comparative Example.

FIG. 6 is a scanning electron microscope (SEM) image showing a state in which the electrolyte is squeezed out from the pores of the cathode layer in the metal-air battery according to the Comparative Example.

However, according to the disclosed metal-air battery, use of a separate electrolyte may be omitted in a cathode portion or only a portion of the separate electrolyte may be used therein, thereby fundamentally preventing or reducing the electrolyte squeeze-out described with reference to FIGS. 5 and 6. Therefore, even in this aspect, it is possible to maintain performance of a battery and increase a battery life.

Figure 7:
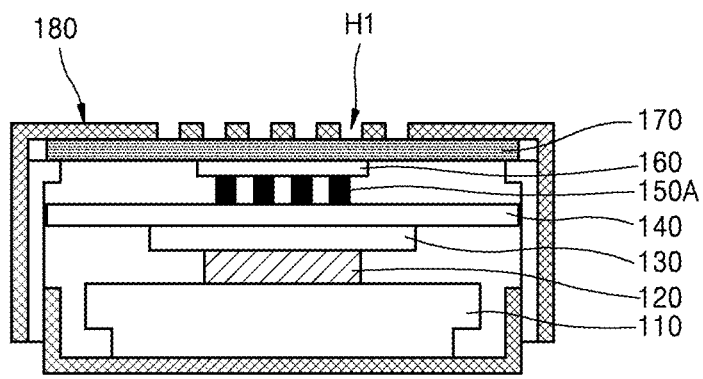
FIG. 7 is a cross-sectional view showing a configuration of another embodiment of a metal-air battery.

FIG. 7 is a cross-sectional view of a configuration of a metal-air battery according to another embodiment. The present structure may be an experimental structure for evaluating performance of a metal-air battery.

Referring to FIG. 7, the metal-air battery according to the present embodiment may have a coin cell shape. Elements of the metal-air battery may be disposed in a case 180 having a plurality of openings H1. A support structure 110 may be disposed on a lower surface of the case 180. The support structure 110 may include, for example, a spacer and a spring member. An anode layer 120 including a metal may be disposed on the support structure 110. A reaction inhibition layer 130 and a separator 140 may be sequentially disposed on the anode layer 120. The reaction inhibition layer 130 may be disposed between the anode layer 120 and the separator 140 and may function to inhibit/prevent a reaction between the anode layer 120 and the separator 140. The reaction inhibition layer 130 may have a function for conducting ions. A cathode layer 150A may be disposed on the separator 140. The cathode layer 150A may include a hybrid conductive material, that is, a material capable of conducting both electrons and ions. The cathode layer 150A may have a structure including a plurality of pores. An electroconductive material layer 160 (hereinafter, referred to as a conductive layer) may be disposed on the cathode layer 150A. A gas diffusion layer 170 may be disposed on the conductive layer 160. The gas diffusion layer 170 may be disposed adjacent to the plurality of openings H1 and may function to supply air to the cathode layer 150A from the outside.

In a specific example, the anode layer 120 may include lithium (Li). The separator 140 may include a solid electrolyte, e.g., lithium aluminum titanium phosphate (LATP). The LATP may be represented by $Li_{1+x}Al_xTi_{2-x}(PO_4)_3$, wherein x may be 0.3. In addition, the separator 140 may further include tylosin (TYL) as an additive. The cathode layer 150A may include lithium cobalt oxide (LCO) as a hybrid conductive material. The conductive layer 160 may include gold (Au).

Figure 8:
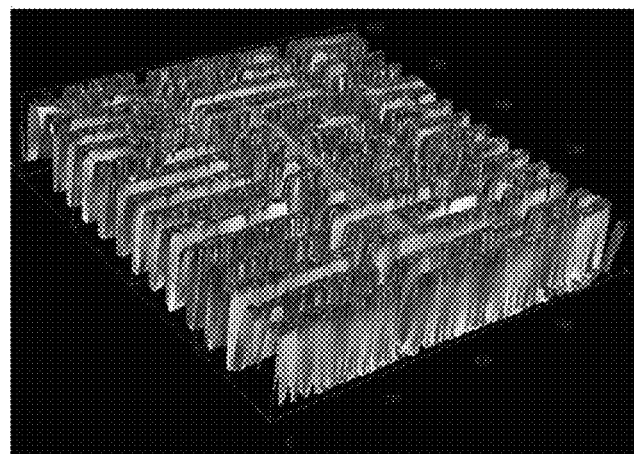
FIG. 8 is a perspective view illustrating an example of a lamellar structure of a cathode layer of FIG. 7.

FIG. 8 is a perspective view illustrating an example of a lamella structure of the cathode layer 150A of FIG. 7. A cathode layer of FIG. 8 may include micron size lamella structured LCO. The micron size lamella structured LCO having a meandering shape (e.g., zigzag shape) and may be disposed on a plane so as to have a three-dimensional lamella structure.

It was experimentally confirmed whether oxygen ($O_2$) in air was reduced/oxidized on a surface of the cathode layer 150A of the metal-air battery described with reference to FIGS. 7 and 8. To this end, characteristic evaluation was performed in oxygen ($O_2$) and nitrogen ($N_2$) atmospheres. In addition, cyclability of a battery was evaluated by repeating a charge/discharge experiment on a metal-air battery. Results of the characteristic evaluation were shown in FIGS. 9 to 14.

Figure 9:
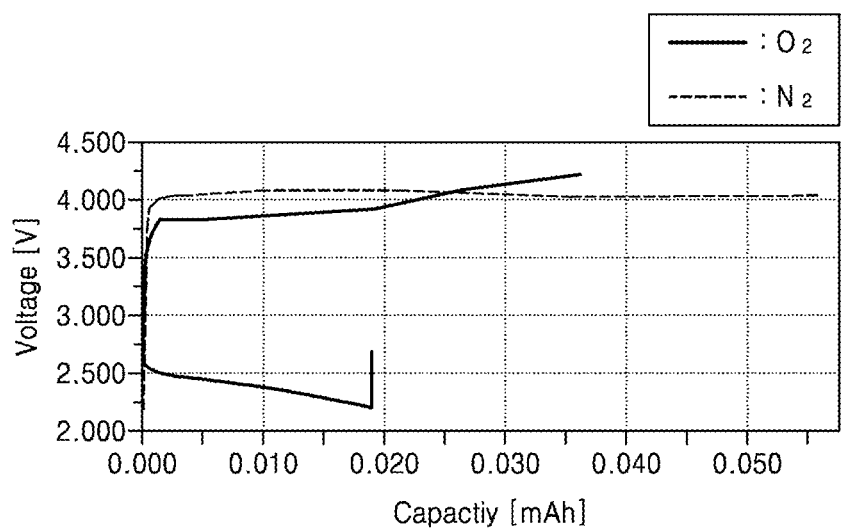
FIG. 9 is a graph of voltage (volts) versus capacity (milliampere-hours) showing charge/discharge characteristics of a metal-air battery having a structure of FIG. 7.

FIG. 9 is a graph showing the results of charge/discharge evaluation of a metal-air battery having the structure of FIG. 7. The graph of FIG. 9 shows the result obtained in an oxygen ($O_2$) atmosphere and a result obtained in a nitrogen ($N_2$) atmosphere.

Referring to FIG. 9, it may be seen that the metal-air battery does not operate and discharge characteristics thereof do not appear in the nitrogen ($N_2$) atmosphere. It may be confirmed that charge/discharge characteristics of the metal-air battery appear in the oxygen ($O_2$) atmosphere. Here, it was assumed that a cathode layer (including LCO) had a specific surface area of about 30 $cm^2$. When it was assumed that $Li_2O_2$ having a thickness of about 2 nanometers (nm) was generated, a discharge capacity was about 0.01668 milliampere-hour (mAh). When it was assumed that discharging was performed for 4 hours, a discharge current was about 0.004 milliamperes per cell (mA/cell). The discharge capacity and the discharge current are simulation results. The discharge capacity and the discharge current may vary according to measurement conditions. As confirmed from FIG. 9, the metal-air battery provides desirable charge/discharge characteristics in the oxygen atmosphere.

Figure 10:
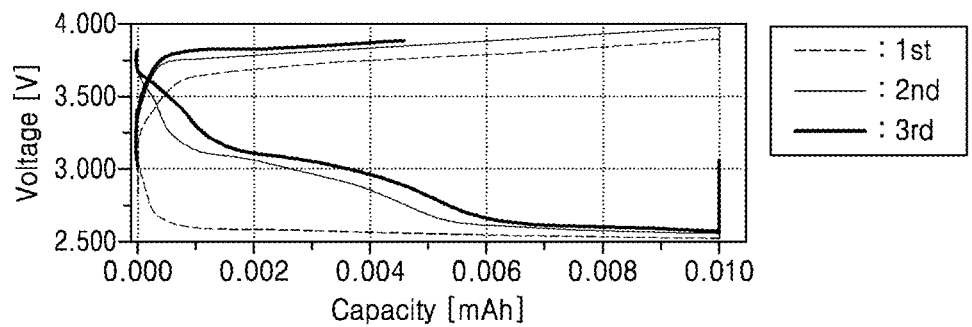
FIGS. 10 to 12 are each a graph of voltage (volts) versus capacity (milliampere-hours) showing cyclability of metal-air batteries according to an embodiment.
Figure 11:
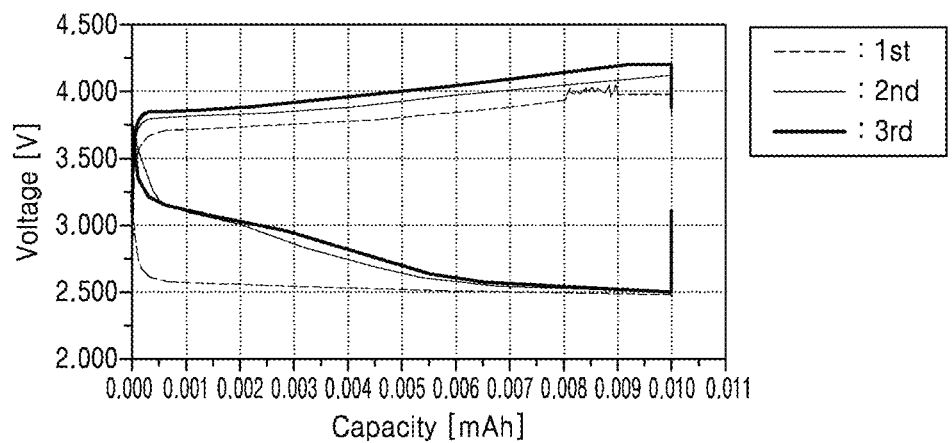
Figure 12:
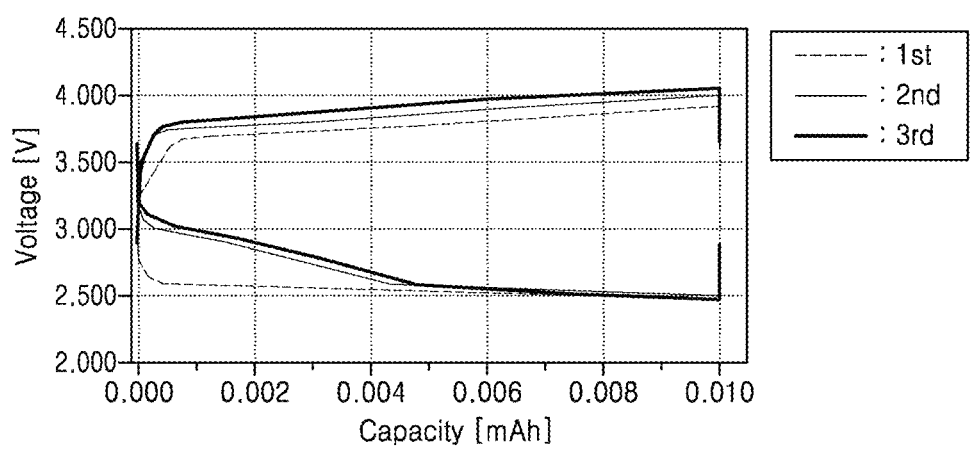

FIGS. 10 to 12 are graphs showing cyclability obtained by repeatably charging and discharging the disclosed metal-air battery. After batteries having the structure as illustrated in FIG. 7 were manufactured, a charge/discharge experiment was performed three times on each battery in an oxygen ($O_2$) atmosphere.

Referring to FIGS. 10 to 12, it may be confirmed that each battery can be charged and discharged reproducibly. During the first discharge, it may be estimated that oxygen ($O_2$) reduction occurs. During first charge, it may be estimated that since charging is performed at a voltage less than a voltage in a nitrogen ($N_2$) atmosphere (see FIG. 9), oxygen ($O_2$) oxidation occurs. During a second discharge, it may be seemed that LCO-induced discharge occurs at the beginning of the second discharge and oxygen ($O_2$) reduction occurs at the end of the second discharge. Therefore, it may be estimated that LCO and $O_2$ are oxidized during the first charge. FIGS. 10 to 12 illustrate the cyclability of the disclosed metal-air battery.

Figure 13:
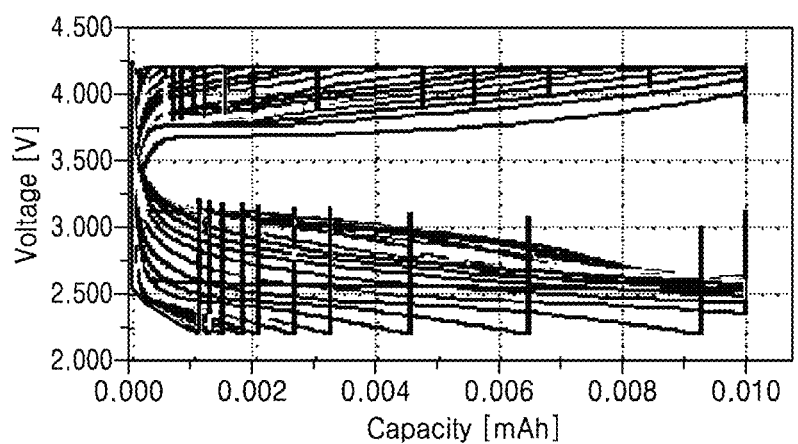
FIG. 13 is a graph of voltage (volts) versus capacity (milliampere-hours) showing the results of repeated charge/discharge of a metal-air battery according to an embodiment.
Figure 14:
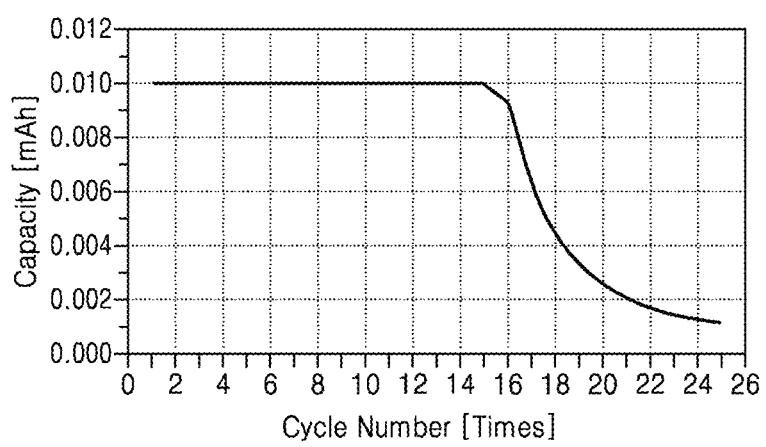
FIG. 14 is a graph of capacity (milliampere-hours) versus cycle number for a metal-air battery according to an embodiment.

FIG. 13 is a graph showing the results of repeated charge and discharge of a metal-air battery according to an embodiment. FIG. 14 is a graph showing a capacity according to a charge/discharge cycle number of the metal-air battery according to an embodiment. The result of FIG. 14 is obtained from the results of FIG. 13.

Referring to FIGS. 13 and 14, it may be confirmed that charge/discharge characteristics reproducibly appear up to about 16 cycles. The results are fundamental experimental results. Charge/discharge reproducibility and cyclability may be considerably improved according to a configuration of a cathode layer and other conditions.

Figure 15:
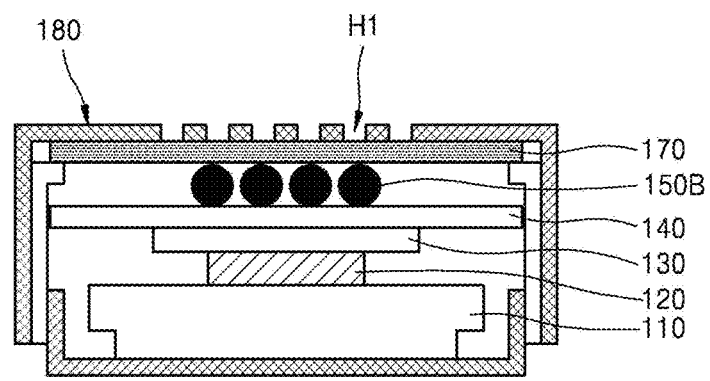
FIG. 15 is a cross-sectional view of a configuration of another embodiment of a metal-air battery.

FIG. 15 is a cross-sectional view illustrating a configuration of a metal-air battery according to another embodiment. The present configuration is another example of an embodiment of the structure of the disclosed battery.

A cathode layer 150B including a plurality of particles is illustrated in FIG. 15. The cathode layer 150B may have a pore-containing structure having a high specific surface area due to the plurality of particles. For example, the cathode layer 150B may include the plurality of particles including a hybrid conductive material. Here, the hybrid conductive material may be lithium manganese oxide (LMO). The remaining configurations except for the structure of the cathode layer 150B may be substantially the same as or similar to the configuration described with reference to FIG. 7. The conductive layer 160 of FIG. 7 may be omitted (not be used) in FIG. 15. The reaction inhibition layer 130 may be omitted.

Figure 16:
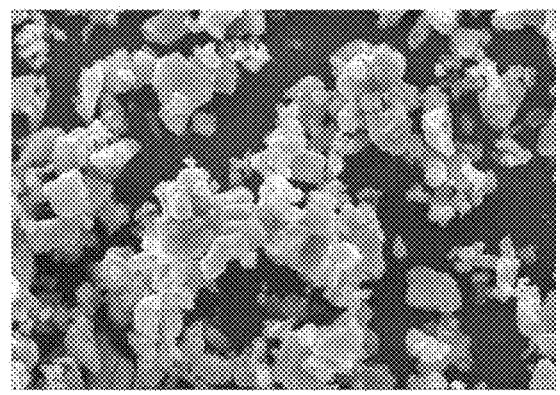
FIG. 16 is a SEM image showing an example of a particle-containing structure of a cathode layer.

FIG. 16 is a SEM image showing an example of the particle-containing structure of the cathode layer 150B of FIG. 15. FIG. 16 is an image showing an upper surface of a cathode layer. Here, the cathode layer may include a plurality of LMO particles.

Characteristic evaluation was performed on the metal-air battery described with reference to FIGS. 15 and 16. Results of the characteristic evaluation were shown in FIGS. 17A to 17C and 18.

Figure 17A:
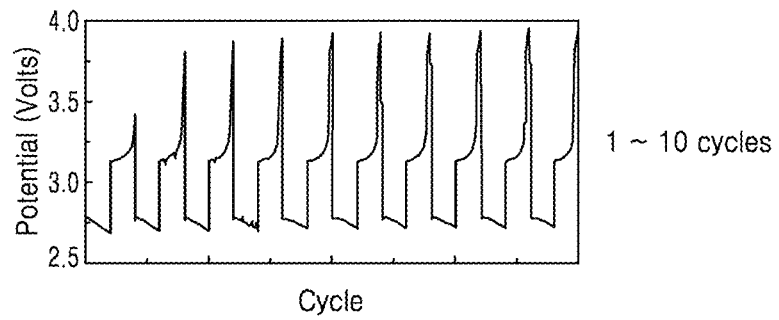
FIGS. 17A to 17C are each a graph of potential (volts) versus cycle number, showing results obtained by repeated charge/discharge of a metal-air battery according to an embodiment.
Figure 17B:
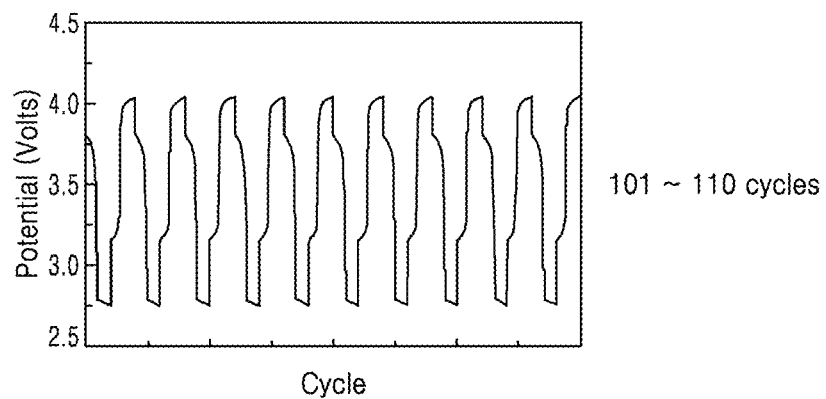
Figure 17C:
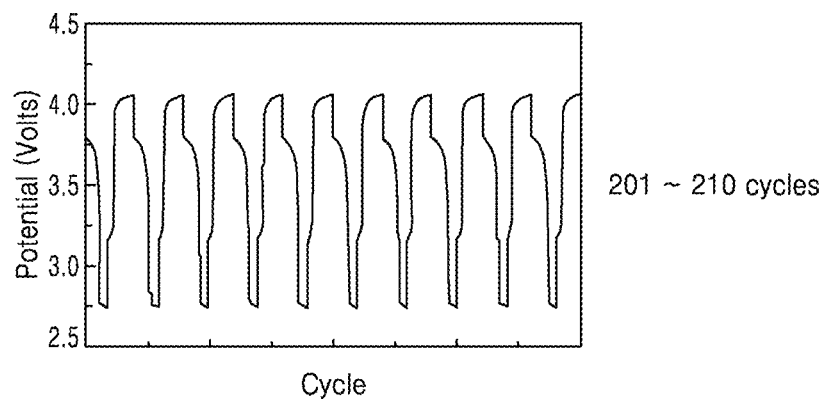

FIGS. 17A to 17C are graphs showing results obtained by repeatably charging and discharging a metal-air battery according to an embodiment. A charge/discharge experiment was repeated on a battery having the structure as illustrated in FIG. 15. FIG. 17A shows a result corresponding to 1-10 cycles. FIG. 17B shows a result corresponding to 101-110 cycles. FIG. 17C shows a result corresponding to 201-210 cycles.

Figure 18:
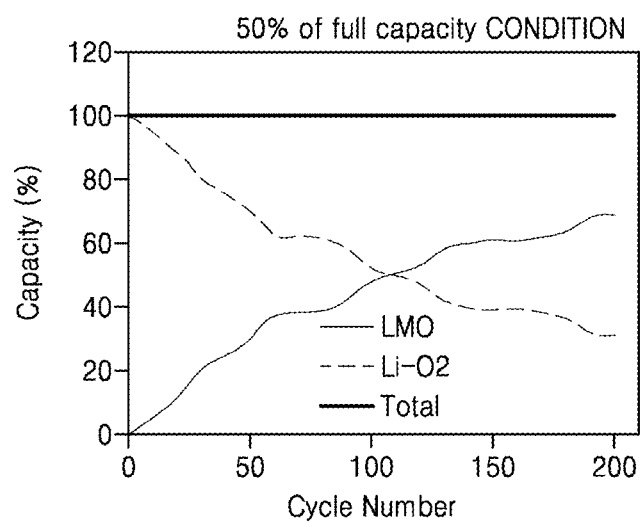
FIG. 18 is a graph of capacity (percent, %) versus cycle number showing capacity fade characteristics of a metal-air battery according to an embodiment.

FIG. 18 is a graph showing a capacity a metal-air battery for 200 charge/discharge cycles. FIG. 18 shows a measurement result for a battery having the structure of FIG. 15. The measurement was performed in a condition corresponding to 50% of a full capacity, i.e., 50% depth of discharge. A total cycle number was 200.

Referring to FIG. 18, it may be seen that as the charge/discharge cycle number is increased, a capacity fade rate corresponding to an LMO cathode material is gradually increased and a capacity fade rate corresponding to a Li—$O_2$ material is gradually decreased. As a result, it may be confirmed that the LMO material functions as an air electrode and the battery operates as a metal-air battery.

Figure 19:
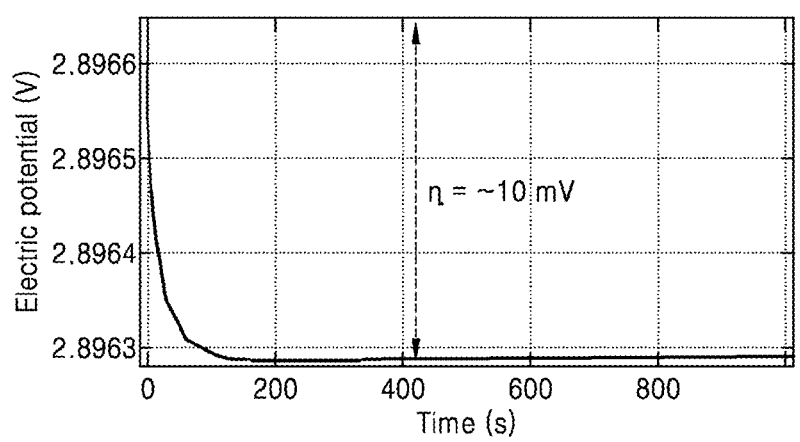
FIG. 19 is a graph of electric potential (volts) versus time (seconds) showing a simulation result of an electrochemical module according to an embodiment.

FIG. 19 is a discharge graph showing a simulation result of an electrochemical module according to an embodiment. The discharge graph of FIG. 19 shows the simulation result obtained by performing a simulation on the electrochemical module by using the COMSOL analysis program, commercially available from COMSOL Inc., having an office in Burlington, Mass., assuming that a hybrid conductive material, that is, LCO, is used as a cathode layer material.

Referring to FIG. 19, a voltage drop due to a resistance in LCO is about 10 millivolts (mV.) This is understood to mean that an influence of overpotential due to the resistance and mass transport in the LCO is negligible. Therefore, a hybrid conductive material such as LCO may be usefully used as a cathode material of a metal-air battery according to an embodiment.

Figure 20:
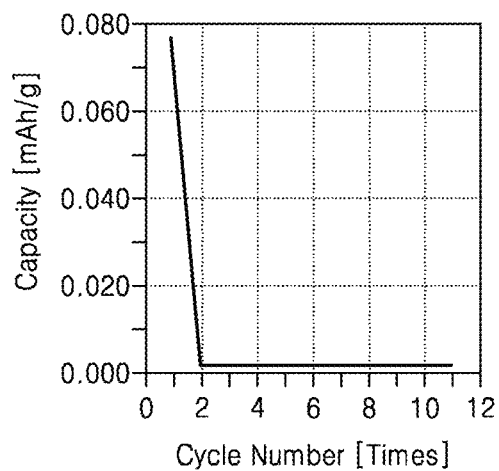
FIG. 20 is a graph of capacity (milliampere hours per gram) versus cycle number showing for the metal-air battery according to the Comparative Example.

FIG. 20 is a graph showing a capacity of the metal-air battery according to a Comparative Example for 11 charge/discharge cycles. The metal-air battery according to the Comparative Example used an organic electrolyte, that is, polyethylene oxide (PEO) for the electrolyte 80, and has the structure shown in FIG. 4.

Referring to FIG. 20, the metal-air battery according to the Comparative Example only provided a single charge/discharge cycle.

Figure 21:
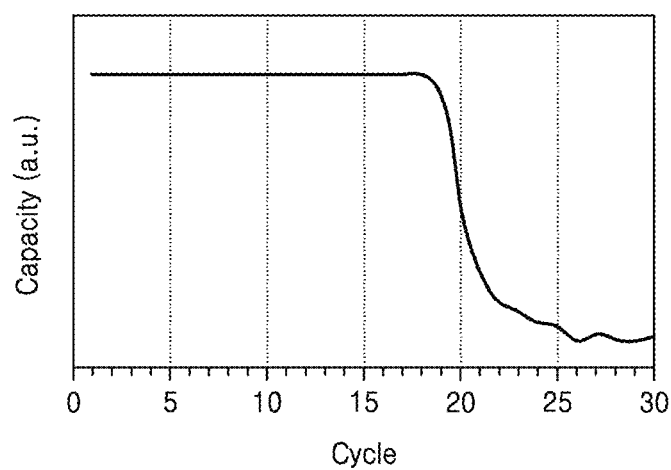
FIG. 21 is a graph of capacity (arbitrary units, a.u.) versus cycle number showing for a metal-air battery according to an embodiment.

FIG. 21 is a graph showing a capacity of the metal-air battery according to the embodiment over 30 cycles. The metal-air battery according to the embodiment did not use an organic electrolyte and used a hybrid conductive material capable of conducting both electrons and ions as a cathode material. FIG. 21 shows a result obtained when a reaction product ($Li_2O_2$) is generated in the same amount as in FIG. 20.

Referring to FIG. 21, the disclosed metal-air battery provided about 18 cycles at a constant capacity. Thus, the cyclability of the metal-air battery according to the embodiment is unexpectedly improved relative to the metal-air battery according to the Comparative Example. FIG. 21 shows a fundamental experimental result. Charge/discharge cyclability may be considerably improved according to a configuration of a cathode layer and other conditions.

The aforementioned metal-air battery may use a hybrid conductive material capable of conducting both electrons and ions as a cathode material, thereby fundamentally preventing or reducing chemical deterioration and an electrolyte squeeze-out, caused by an organic electrolyte. Therefore, it is possible to improve performance of a battery, increase a battery life, and reduce manufacturing processes and costs. The metal-air batteries may be applied as a power supply of various electronics devices including an electric vehicle. The metal-air batteries according to the present embodiments may be usefully applied in all fields in which a secondary battery is applied.

While the above description has been particularly shown in detail, it will be understood by those skilled in the art that the description should be considered as illustrations of preferred embodiments rather than for purposes of limitation of the scope of the invention. For example, it will be understood by those skilled in the art that the structures of the metal-air batteries described with reference to FIGS. 1 to 3, 7, 8, 15, and 16 may be variously changed in form and details. In a specific example, reaction efficiency may be improved by applying or dispersing a certain metal material on a surface of a cathode layer according to an embodiment. In addition, the cathode layer according to the embodiment may include a hybrid conductive material and also further include other materials. Therefore, the scope of the invention is defined not by the detailed description of the invention but by the technical spirit disclosed in the appended claims.

It should be understood that embodiments described herein should be considered in a descriptive sense only and not for purposes of limitation. Descriptions of features or aspects within each embodiment should be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A metal-air battery comprising:
an anode layer comprising a metal;
a porous cathode layer spaced apart from the anode layer and comprising a hybrid conductive material having both electron conductivity and ionic conductivity, wherein all spaces and pores in the cathode layer are electrolyte-free; and
a separator disposed between the anode layer and the cathode layer,
wherein a ratio of cation conductivity to electron conductivity of the hybrid conductive material is in a range of about 0.01 to about 100.

2. The metal-air battery of claim 1, wherein the hybrid conductive material has an electron conductivity of about $10^{-5}$ Siemens per centimeter or greater.

3. The metal-air battery of claim 1, wherein the hybrid conductive material comprises a channel for metal ion transfer and a channel for electron transfer.

4. The metal-air battery of claim 3, wherein the ratio of the cation conductivity to the electron conductivity of the hybrid conductive material is in a range of about 1 to about 10.

5. The metal-air battery of claim 1, wherein the hybrid conductive material further comprises a reaction product of a metal ion and a gas.

6. The metal-air battery of claim 5, wherein the reaction product comprises a lithium-based oxide, a sodium-based oxide, or a combination thereof.

7. The metal-air battery of claim 1, wherein the hybrid conductive material comprises an inorganic material having a perovskite structure, an anti-perovskite structure, a layered structure, a spinel structure, a sodium super ion conductor structure, or a combination thereof.

8. The metal-air battery of claim 7, wherein the hybrid conductive material comprises lithium manganese oxide, lithium cobalt oxide, lithium manganese nickel oxide, lithium nickel manganese cobalt oxide, lithium nickel oxide, lithium iron phosphate, lithium iron manganese phosphate, or a combination thereof.

9. The metal-air battery of claim 7, wherein the hybrid conductive material is a solid inorganic compound.

10. The metal-air battery of claim 1, wherein the porous cathode layer has porosity of about 90 volume percent or less, based on a total volume of the porous cathode layer.

11. The metal-air battery of claim 1, wherein the porous cathode layer has a specific surface area of about 100 square meters per gram or greater.

12. The metal-air battery of claim 1, wherein the porous cathode layer has a lamellar structure.

13. The metal-air battery of claim 1, wherein the porous cathode layer consists of the hybrid conductive material.

14. The metal-air battery of claim 1, wherein the porous cathode layer does not comprise carbon.

15. The metal-air battery of claim 1, wherein the metal-air battery further comprises a gas diffusion layer disposed on at least one surface of the cathode layer.

16. The metal-air battery of claim 1, wherein the separator comprises a solid electrolyte.

17. The metal-air battery of claim 1, wherein the metal-air battery does not comprise a liquid electrolyte.

18. The metal-air battery of claim 1, wherein the metal-air battery does not comprise an organic electrolyte.

19. A metal-air battery comprising:
a porous cathode layer consisting of
a plurality of pores and a hybrid conductive material having both ionic conductivity and electron conductivity, or
the plurality of pores, the hybrid conductive material, and a reaction product of a metal ion and a gas,
wherein all pores present in the porous cathode layer are electrolyte-free and wherein the reaction product of the metal ion and the gas is disposed in the plurality of pores;
an anode layer comprising a metal; and
a separator between the anode layer and the cathode layer and comprising a solid electrolyte, wherein the hybrid conductive material is an inorganic material having a perovskite structure, an anti-perovskite structure, a layered structure, a spinel structure, a sodium super ion conductor structure, or a combination thereof, and wherein a ratio of cation conductivity to electron conductivity of the hybrid conductive material is in a range of about 0.01 to about 100.

20. The metal-air battery of claim 19, wherein the hybrid conductive material is a solid inorganic compound comprising a metal element, and wherein the cathode layer does not comprise an organic electrolyte.

21. The metal-air battery of claim 19, wherein the ratio of the cation conductivity to the electron conductivity of the hybrid conductive material is in a range of about 1 to about 10.

22. The metal-air battery of claim 19, wherein the hybrid conductive material is a lithium-based oxide, a sodium-based oxide, or a combination thereof.

23. The metal-air battery of claim 19, wherein the hybrid conductive material is lithium manganese oxide, lithium cobalt oxide, lithium manganese nickel oxide, lithium nickel manganese cobalt oxide, lithium nickel oxide, lithium iron phosphate, lithium iron manganese phosphate, or a combination thereof.

24. The metal-air battery of claim 19, wherein the porous cathode layer has porosity of about 90 volume percent or less, based on a total volume of the porous cathode layer.

25. The metal-air battery of claim 19, wherein the cathode layer does not comprise a carbon-containing material.

26. The metal-air battery of claim 19, wherein the metal-air battery further comprises a gas diffusion layer disposed on at least one surface of the cathode layer.

* * * * *